Patented May 24, 1932

1,859,686

UNITED STATES PATENT OFFICE

EDUARD TSCHUNKUR AND WALTER BOCK, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

NEW RUBBER LIKE MASSES AND PROCESS OF PREPARING THE SAME

No Drawing. Application filed January 7, 1930, Serial No. 419,198, and in Germany January 15, 1927.

The present invention relates to new rubber like substances and to a process of preparing same.

In accordance with the invention nervous and plastic rubber-like masses are obtainable by polymerizing butadiene or isoprone in the presence of an alkali metal, especially sodium metal, and in the presence of a liquid aliphatic ether, such as dimethylether, diethylether, methylethylether, dipropylether, diisobutylether, isopropyl-tertiary-butylether, mixtures of such ethers and the like. By the addition of these ethers, the polymerization process of the hydrocarbons as well as the quality of the polymerizates obtained are favorably influenced. The polymerization proceeds more evenly and the rubber-like masses formed are essentially more nervous and plastic than the rubber-like masses prepared according to the same method, but without the addition of an ether. In accordance with the invention, the ethers mentioned are applied in an amount below about 5% by weight of the amount of the hydrocarbon; it may, however, be mentioned that already with quantities of 0.5-1.5% good results are obtained. The amount of alkali metal used is best held within the limits customary for such polymerization process, say between about 0.1-2% by weight of the hydrocarbon applied. Likewise, the temperatures during the polymerization may be the usual ones, say between about 10-45° C. The ethers referred to above may likewise be used in connection with further additions influencing polymerization by means of alkali metals, such as, for instance, plastifying agents or the like.

The invention is illustrated by the following examples, without being restricted thereto.

*Example 1.*—150 kgs. of butadiene are polymerized in an autoclave and in a nitrogen atmosphere in the presence of 0.75 kg. of diisobutylether and 0.25 kg. of sodium wire at normal temperature. After 3 to 4 days, a very nervous, rubber-like mass is obtained in a quantitative yield.

*Example 2.*—150 kgs. of butadiene are polymerized in an autoclave and in a butadiene atmosphere in the presence of 0.5 kg. of diamylether and 0.3 kg. of sodium metal. A nervous and elastic polymerizate, similar to that of Example 1, is thus obtained.

*Example 3.*—100 kgs. of isoprene together with 1.5 kgs. of diethylether and 0.5 kg. of sodium wire are allowed to stand in a suitable container until polymerization is finished. Also in this case a nervous and elastic rubber-like mass is obtained.

This is a continuation in part of our copending application Serial No. 246,377, filed January 12, 1928.

We claim:—

1. Process which comprises polymerizing a hydrocarbon of the formula

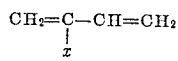

wherein $x$ means hydrogen or methyl, in the presence of an alkali metal and of a liquid saturated simple aliphatic ether in an amount below about 5% by weight of the hydrocarbon applied.

2. Process which comprises polymerizing a hydrocarbon of the formula

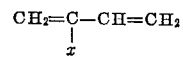

wherein $x$ means hydrogen or methyl in the presence of sodium metal and of a liquid saturated simple aliphatic ether in an amount below about 5% by weight of the hydrocarbon applied.

3. Process which comprises polymerizing a hydrocarbon of the probable formula

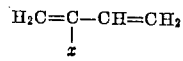

wherein $x$ stands for hydrogen or methyl, in the presence of sodium metal in an amount of 0.1-2% by weight of the hydrocarbon and in the presence of a liquid saturated simple aliphatic ether in an amount of 0.5-1.5% by weight of the hydrocarbon applied, at a temperature between about 10-45° C.

4. The polymerizates obtainable according to the process claimed in claim 1, said polymerizates forming nervous and plastic rubber-like masses.

5. The polymerizates obtainable according to the process claimed in claim 2, said polymerizates forming nervous and plastic rubber-like masses.

6. The polymerizates obtainable according to the process claimed in claim 3, said polymerizates forming nervous and plastic rubber-like masses.

In testimony whereof, we affix our signatures.

EDUARD TSCHUNKUR.
WALTER BOCK.